Patented Feb. 27, 1923.

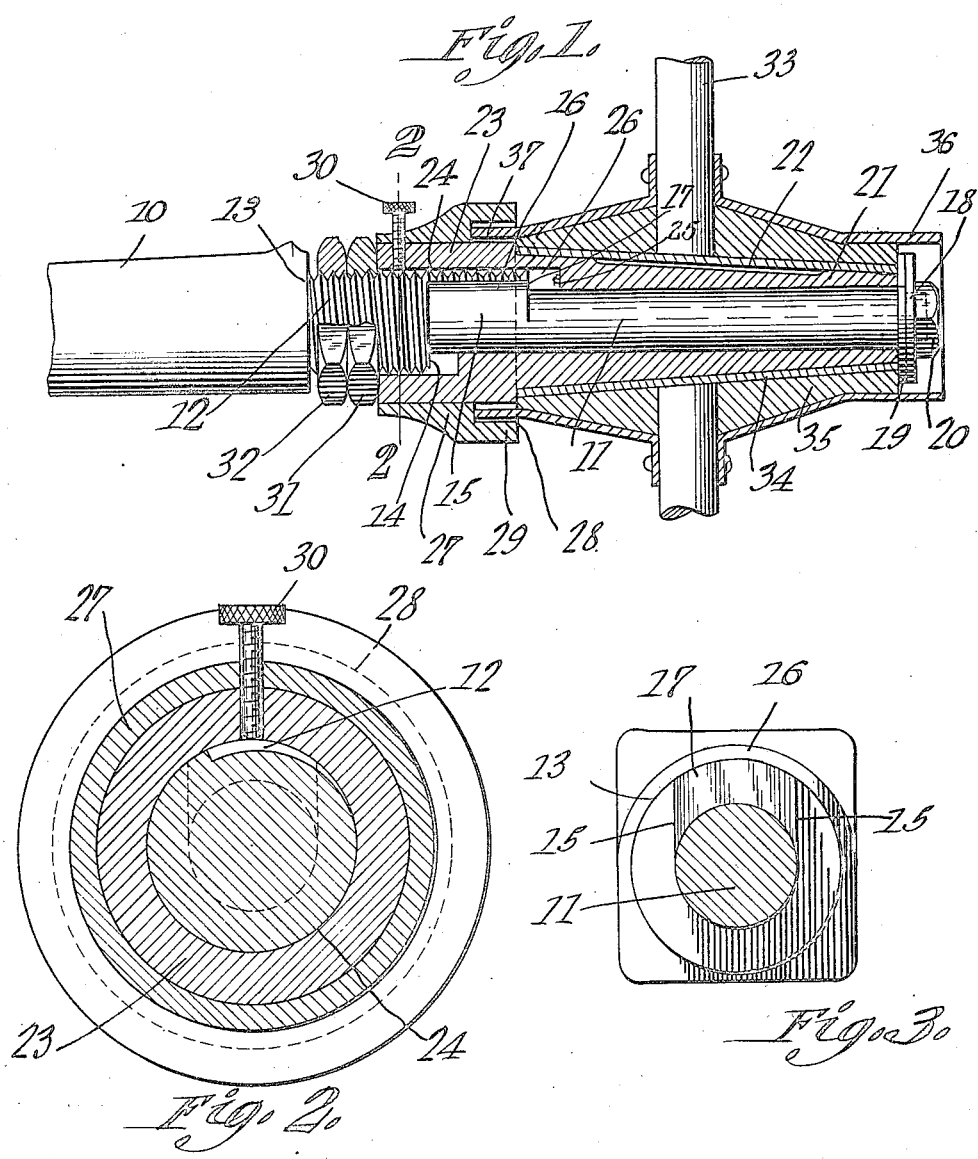

1,446,492

UNITED STATES PATENT OFFICE.

JAMES B. ALDEN, OF VAN, PENNSYLVANIA, ASSIGNOR OF ONE-HALF TO LEROY HANBY, OF VAN, PENNSYLVANIA.

BUGGY SPINDLE.

Application filed April 21, 1920. Serial No. 375,533.

*To all whom it may concern:*

Be it known that I, JAMES B. ALDEN, a citizen of the United States, residing at Van, in the county of Venango and State of Pennsylvania, have invented a new and useful Buggy Spindle, of which the following is a specification.

This invention relates to the class of carriages and wagons and more particularly to an improved axle spindle for use in connection therewith, and primarily intended for use in connection with light vehicles, such as buggies, the object thereof being to provide a sleeve for use in conjunction with the spindle so as to take up wear between the axle box of the wheel and the spindle and permitting the same to be renewed when worn, so as to obviate the necessity of welding a new spindle on the end of the axle to permit further and continued use of the latter, thus producing a device which will greatly reduce the cost of upkeep in maintaining the spindles in proper condition.

A further object of the invention is to provide a buggy spindle of novel construction, including a spindle proper so formed as to permit convenient application and secure attachment of a spindle sleeve thereon adapted to take wear, together with novel means for preventing the entrance of dirt, dust or foreign matter between the axle box of the wheel and the spindle, in conjunction with novel means for retaining the bearing sleeve of the spindle firmly in position against endwise movement or end thrust so as to prevent the vehicle from wabbling or moving from side to side.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a longitudinal section of a spindle constructed in accordance with the invention, parts thereof being shown in elevation and the spindle having a wheel engaged thereon;

Figure 2 is an enlarged transverse sectional view taken on the line 2—2 of Figure 1, and Figure 3 is a transverse section through the spindle with the hub removed.

Referring to the drawings in detail, in which like reference characters designate corresponding parts throughout the several views, the numeral 10 designates the axle, which is formed with the spindle proper 11 having the relatively large externally threaded portion 12 with a shoulder 13 formed at its junction with the axle 10. The threaded circular portion is cut away at the bottom and on opposite sides to form another shoulder 14 facing in the same direction as the shoulder 13. The sides 15 produce a longitudinal extension or rib 16 at the top, the outer face of which conforms to the circle of the threaded portion 12 and terminates in a shoulder 17 having opposed parallel sides, thus producing an extension or key of polygonal formation, for a purpose to be hereinafter made apparent.

The spindle 11 beyond the portions 12 and 15, is of further reduced circular cross-section and of uniform diameter as far as the threaded extremity 18, which latter is adapted for engagement by a washer 19 adapted to take up wear and a retaining nut 20 threaded thereon. In order to obviate the necessity of removing the worn spindles of axles and welding new spindles thereon, the spindle 11 is not designed to receive thereon, a rotating part, so that the wear thereon is minimized. A uniformly bored sleeve 21 is mounted on the spindle proper and is of tapered formation externally and provided with a longitudinal grease groove 22 in the top portion thereof in the usual manner. This sleeve 21 is designed to abut washer 19 at its outer end and is formed at its inner end with an enlargement 23 having a shoulder 25 at the inner end of said enlargement the bore of the enlargement being provided with a key way slot or recess 26 adapted to receive the extension or key 16 of the spindle so that the sleeve is held against rotation on the spindle. It is of course to be understood that in lieu of this connection, any suitable means may be provided whereby the sleeve will be held stationary on the spindle proper, so that the latter will be protected against wear while the sleeve will serve to take up the same and can be readily renewed or replaced when worn, in order to keep the bearing in proper condition.

At its inner end, the sleeve is provided with a circular collar 27 provided with a counter bore groove 28 forming an outwardly facing bringing flange 29 over the portion 23, said collar 27 being shown formed as an independent section fitted snugly thereon and adapted to be secured in position through the medium of a retaining member or set screw 30, which is shown in Figure 1, engaged through the respective parts and with the enlarged threaded portion 12 of the spindle. By this means, the sleeve is firmly held in position so as to abut the washer 19 and against turning, but to insure against end thrust of the sleeve, a nut 31 is engaged on the threaded portion 12 and is packed up by a jam nut 32 also engaged thereon and contacting with the inner end of the sleeve, thus firmly securing the sleeve in position. Thus, when a wheel 33 is mounted on the spindle, the axle box 34 within its hub 35, will be rotatably mounted on the sleeve 21, retained against end thrust, and the outer end of the spindle together with the washer 19 and the nut 20, will be housed by the flange or thimble 36. Similarly, the flange or extension 37 at the inner end of the hub, will be received within the flange 29, thus serving to break the straight line of passage or escape, in order that the entrance of dirt or dust or other foreign matter between the bearing sleeve and the axle box will be prevented. In this manner, the parts may be retained in a properly lubricated condition, and wear being removed from the spindle proper, the sleeve thereof may be renewed easily and cheaply, so as to permit the spindles to be retained in proper condition at a low cost of upkeep. Furthermore, by altering the size of the sleeve 21, the spindle may be adapted to accommodate wheels or hubs of varying sizes thus obviating the necessity of changing the spindles or welding a new one at the ends of the axles, while the washer protects the nut against wear due to the friction of the rotating part or hub of the wheel, while the engagement of the nuts 31 and 32 with the inner end of the sleeve, serves to keep the nuts from unduly tightening thereon in conjunction with the fact that the sleeve is held from turning.

Having thus described the invention what I claim is:

The combination of an axle having a reduced extension to form a spindle with a threaded connector uniting them, said spindle having an exteriorly threaded key at its inner end, the threads thereof conforming to those of the connector, a sleeve interiorly shaped to fit said spindle and having a recess to receive and fit said key to hold the sleeve against turning, said sleeve being provided with an external shoulder spaced from its inner end to form an abutment for the axle box of a wheel hub, a sand band carried by said sleeve, and thrust means for securing the sleeve against longitudinal movement on the spindle.

In testimony that I claim the foregoing as my own, I have hereto affixed my signature in the presence of two witnesses.

JAMES B. ALDEN.

Witnesses:
J. M. JONES,
LEROY HANBY.